US009503706B2

(12) United States Patent
Loce et al.

(10) Patent No.: US 9,503,706 B2
(45) Date of Patent: Nov. 22, 2016

(54) DETERMINING SOURCE LANE OF MOVING ITEM MERGING INTO DESTINATION LANE

(71) Applicant: XEROX CORPORATION, Norwalk, CT (US)

(72) Inventors: Robert P. Loce, Webster, NY (US); Wencheng Wu, Webster, NY (US); Thomas F. Wade, Rochester, NY (US); Daniel S. Hann, Williamson, NY (US); Peter Paul, Webster, NY (US); Aaron M. Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 271 days.

(21) Appl. No.: 14/022,488

(22) Filed: Sep. 10, 2013

(65) Prior Publication Data

US 2015/0070471 A1    Mar. 12, 2015

(51) Int. Cl.
| | | |
|---|---|---|
| *G03B 13/00* | (2006.01) | |
| *H04N 5/232* | (2006.01) | |
| *H04N 13/02* | (2006.01) | |
| *G06Q 20/38* | (2012.01) | |
| *G06Q 20/14* | (2012.01) | |
| *G06T 7/20* | (2006.01) | |
| *G06K 9/00* | (2006.01) | |
| *H04N 7/18* | (2006.01) | |

(52) U.S. Cl.
CPC ...... *H04N 13/0239* (2013.01); *G06K 9/00785* (2013.01); *G06Q 20/145* (2013.01); *G06Q 20/38* (2013.01); *G06T 7/2086* (2013.01); *G06T 2207/30256* (2013.01); *H04N 7/181* (2013.01)

(58) Field of Classification Search
CPC ......... H04N 13/02; H04N 7/18; G06Q 20/38

USPC .......................................................... 348/47
See application file for complete search history.

(56) References Cited

U.S. PATENT DOCUMENTS

| | | |
|---|---|---|
| 6,556,916 B2 | 4/2003 | Waite et al. |
| 6,940,393 B2 | 9/2005 | Dev et al. |
| 7,426,450 B2 | 9/2008 | Arnold et al. |

(Continued)

OTHER PUBLICATIONS

McKinnon, I.A., Operational and Safety-Based Analysis of Varied Toll Lane Configurations, Thesis, Masters of Science in Civil Engineering, University of Massachusetts Amherst, May 2013. Document retrieved from Scholarworks at the University of Massachusetts Amherst (http://scholarworks.umass.edu/theses/1067/).*

(Continued)

*Primary Examiner* — David N Werner
*Assistant Examiner* — Richard A Hansell, Jr.
(74) *Attorney, Agent, or Firm* — Gibb & Riley, LLC

(57) ABSTRACT

Methods and devices acquire images using a stereo camera or camera network aimed at a first location. The first location comprises multiple parallel primary lanes merging into a reduced number of at least one secondary lane, and moving items within the primary lanes initiate transactions while in the primary lanes and complete the transactions while in the secondary lane. Such methods and devices calculate distances of the moving items from the camera to identify in which of the primary lanes each of the moving items was located before merging into the secondary lane. These methods and devices then order the transactions in a merge order corresponding to a sequence in which the moving items entered the secondary lane from the primary lanes. Also, the methods and devices output the transactions in the merge.

24 Claims, 12 Drawing Sheets

(56) References Cited

U.S. PATENT DOCUMENTS

| | | |
|---|---|---|
| 7,454,287 B2 | 11/2008 | Manor |
| 7,501,976 B2 | 3/2009 | Manor |
| 7,541,943 B2 | 6/2009 | Manor |
| 7,573,400 B2 | 8/2009 | Arnold et al. |
| 7,884,740 B2 | 2/2011 | Tzuang et al. |
| 7,895,797 B2 | 3/2011 | Bridgman et al. |
| 8,248,272 B2 | 8/2012 | Arnold et al. |
| 2002/0156682 A1* | 10/2002 | DiPietro ............ G07F 7/00 705/16 |
| 2003/0060969 A1* | 3/2003 | Waite ............ G08G 1/042 701/117 |
| 2004/0249497 A1* | 12/2004 | Saigh ............ E04H 14/00 700/216 |
| 2005/0033505 A1* | 2/2005 | Zatz ............ G08G 1/0962 701/117 |
| 2006/0070852 A1* | 4/2006 | Shefet ............ A22C 11/008 198/778 |
| 2006/0218057 A1* | 9/2006 | Fitzpatrick ............ G06Q 10/04 705/28 |
| 2006/0279630 A1* | 12/2006 | Aggarwal ............ G01S 3/7864 348/143 |
| 2007/0088620 A1* | 4/2007 | Tengler ............ G06Q 10/087 705/15 |
| 2007/0124157 A1* | 5/2007 | Laumeyer ............ G01C 21/30 701/420 |
| 2009/0184847 A1* | 7/2009 | Kohli ............ G07B 15/063 340/989 |
| 2009/0255195 A1* | 10/2009 | Bridgman ............ E04H 14/00 52/174 |
| 2011/0088997 A1* | 4/2011 | Petrovic ............ B65G 21/2072 198/461.1 |
| 2011/0304441 A1* | 12/2011 | Roesner ............ G07B 15/063 340/10.4 |
| 2012/0246007 A1* | 9/2012 | Williams ............ G06Q 30/02 705/14.66 |
| 2014/0267793 A1* | 9/2014 | Wang ............ G06K 9/00785 348/207.1 |

OTHER PUBLICATIONS

McKinnon, I.A., Operational and Safety-Based Analysis of Varied Toll Lane Configurations, Thesis, Masters of Science in Civil Engineering, University of Massachusetts Amherst, May 2013. Document retrieved from Scholarworks at the University of Massachusetts Amherst (httpV/scholarworks.umass.edu/theses/I 067/).*

1. P. Felzenszwalb, R. Girshick, D. McAllester, D. Ramanan, "Object Detection with Discriminatively Trained Part Based Models," IEEE Transactions on Pattern Analysis and Machine Intelligence, vol. 32, No. 9, Sep. 2010, pp. 1-20.

Z. Zhang, "Flexible Camera Calibration by Viewing a Plane From Unknown Orientations," ICCV (1999), pp. 1-8.

D. Scharstein, and R. Szeliski, "A taxonomy and evaluation of dense two-frame stereo correspondence algorithms," International Journal of Computer Vision, 47(1):7-42 (2002), pp. 1-35.

* cited by examiner

DETERMINING SOURCE LANE OF MOVING ITEM MERGING INTO DESTINATION LANE

BACKGROUND

Systems and methods herein generally relate to item flow processing and more particularly, to systems and methods that use a camera to determine the source lane of a moving item as multiple source lanes merge into destination lanes.

Computerized systems are useful for improving efficiencies in many areas, such as facilitating movement of items through controlled lanes or paths. Examples of such systems include movement of items on conveyor systems in warehouses; queuing of individuals at airports, amusement parks, and sporting events; processing drive through (or "drive-thru") orders for food and other items at in-vehicle driving establishments; etc. The systems and methods herein will be described using the example of drive through ordering; however, these systems and methods are applicable to all types of processing where people or items merge from multiple source lanes into at least one destination lane.

In vehicle "drive through" operations customers can be served rapidly and cost effectively if certain functions are performed at multiple parallel stations (having respective lanes) and vehicles are merged to fewer lanes for stations that perform other functions. An example is a fast food restaurant having two or three parallel order stations, and a single lane for payment and food pick up. Inefficiencies and problems exist at the merge area following the parallel lanes. Currently, employees use video cameras and monitors to track the source lane of a vehicle as it crosses a merge line. This requires employee effort that could be used elsewhere and is subject to human error that wastes time and creates customer frustration at subsequent stations.

SUMMARY

An exemplary apparatus herein includes an optical stereo camera (a single camera having multiple imaging units or a camera network having multiple cameras) aimed at a first location. The multiple cameras or imaging devices have a field of views that are fixed and overlap the first location. The first location comprises a horizontal surface having multiple parallel primary lanes merging into a reduced number of secondary lanes, such as a single secondary lane. The stereo camera is aimed in a horizontal direction parallel to the horizontal surface. Moving items within the primary lanes initiate transactions and complete the transactions while in the secondary lane.

A processor is operatively connected to the stereo camera. The processor calculates the distances the moving items are from the stereo camera (or distances from a reference camera, if a camera network is used) in the horizontal direction based on differences between images of the moving items obtained by the multiple cameras of the stereo cameras. More specifically, the processor determines the sequence in which the moving items entered the secondary lane by detecting a relative position and relative distance of the moving items as the moving items pass the first location and when at least a portion of the moving items are within the first location. The processor calculates the distances of the moving items from the stereo camera by creating temporal depth profiles for each of the moving items that pass the first location.

This identifies in which of the primary lanes each of the moving items was located before merging into the secondary lane and allows the processor to order the transactions in a "merge order." The merge order corresponds to the sequence in which the moving items entered the secondary lane from the primary lanes. An interface is operatively connected to the processor, and the interface outputs the transactions (in the merge order) to a transaction device that completes the transactions.

Additionally, the processor can develop "initial" signature profile of the moving items as the moving items pass the first location. Such initial signature profile can include items such as color, shape, height, width, etc., of the moving items. The apparatus can further comprise a second stereo camera at a second location of the secondary lane (adjacent where the moving items complete the transaction). The processor can thus similarly develop "confirmation" signature profile of the moving items (that, again, can include color, shape, height, width, etc., of the moving items) as the moving items pass the second location.

These initial and confirmation signature profiles allow the processor to confirm or change the merger order. Specifically, the processor confirms the merge order before the interface outputs the transactions to the transaction device based on the confirmation signature profile matching the initial signature profile. To the contrary, the processor changes the merge order before the interface outputs the transactions to the transaction device based on the confirmation signature profile not matching the initial signature profile.

To satisfy space constraints, in some situations, the stereo camera can be positioned next to the moving items and the processor calculates the distances based only on the side images of the moving items. Further, to simplify the device and reduce costs, the stereo camera can be a stationary, non-moving stereo camera that is in a fixed position.

Exemplary methods herein acquire images using an optical stereo camera (or camera network) aimed at a first location. The first location comprises multiple parallel primary lanes merging into a reduced number of at least one secondary lane, and moving items within the primary lanes initiate transactions and complete the transactions while in the secondary lane. Such methods calculate distances of the moving items from the camera (or distances from a reference camera, if a camera network is used) using a processor operatively connected to the camera to identify in which of the primary lanes each of the moving item was located before merging into the secondary lane. The methods herein thus calculate the distances of the moving items from the camera by creating temporal depth profiles for each of the moving items that pass the first location, using the processor.

These methods then order the transactions in a merge order corresponding to a sequence in which the moving items entered the secondary lane from the primary lanes, using the processor. More specifically, such methods determine the sequence in which the moving items entered the secondary lane by detecting a relative position and relative distance of the moving items as the moving items pass the first location. Also, the methods herein output the transactions in the merge order to a transaction device that completes the transactions, using an interface operatively connected to the processor.

Further, in some instances, these methods can develop initial signature profiles of the moving items. These initial signature profiles comprise the color, shape, height, width, etc., of the moving items as the moving items pass the first location. Also, these methods can similarly develop confirmation signature profiles of the moving items, and these confirmation signature profiles similarly comprise the color, shape, height, width, etc., of the moving items as the moving items pass a second location of the secondary lane (adjacent where the moving items complete the transaction). Thus, these methods confirm the merge order (before the interface outputs the transactions to the transaction device) if the confirmation signature profile matches the initial signature profile, or these methods change the merge order (before the interface outputs the transactions to the transaction device) if the confirmation signature profile does not match the initial signature profile.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, computerized systems are useful for improving efficiencies in many areas, such as facilitating movement of items through controlled lanes or paths. In this area, the systems and methods herein provide a stereo-vision system and method for determining the source lane of a vehicle as it crosses a merge line.

Figure 1:
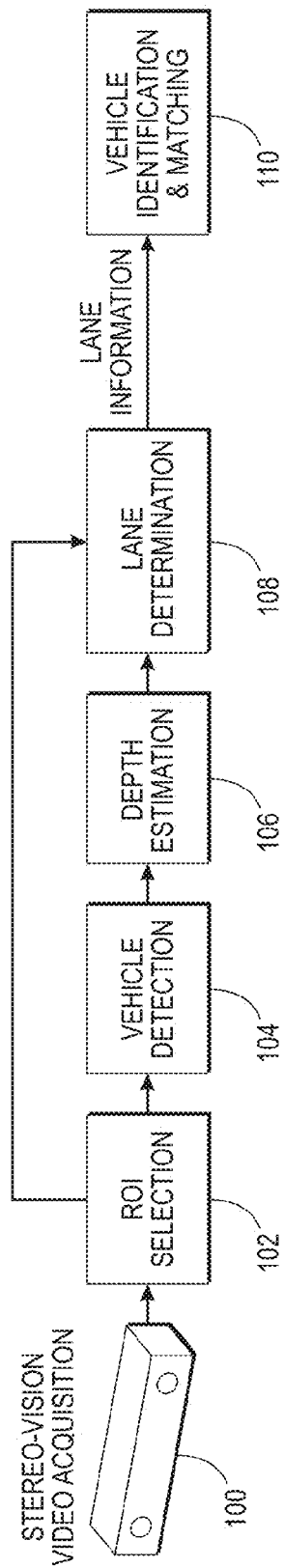
FIG. 1 is a component diagram of various systems herein.

One example of a system herein is shown in FIG. 1. This exemplary system includes various modules. Item 100 represents a stereo-vision video capture module that acquires stereo-pair (multiple view) video or images of the region associated with the merge line (Region Of Interest—ROI) for a drive-through lane. Item 102 represents an ROI selection module that identifies the ROI within the captured images. Item 104 represents a vehicle detection module that determines the presence of a vehicle in the ROI. Item 106 represents a depth estimation module that determines the distance of features in the ROI or a depth map of the ROI. Item 108 represents a lane determination module that determines the source lane of a vehicle of interest in the area about the merge line by using the distance information. Item 110 represents a vehicle identification and matching module that extracts features of the vehicle of interest and matches it with the vehicle features captured at the originating ordering lanes. These modules are explained in greater detail below.

The stereo-vision video capture module 100 comprises at least two cameras, or two camera views. The relative position of the camera is measured or set at installation to provide sufficient different angles to reliably determine the different distances items are positioned from the camera. Methods and systems herein can simplify processing by aligning the cameras so that the two views are set roughly along a horizontal line parallel to the surface of the lanes. Calibration is performed to comprehend the 3D geometry of the area of interest. Any commercially available stereo camera can be used with systems and methods herein.

Figure 2:
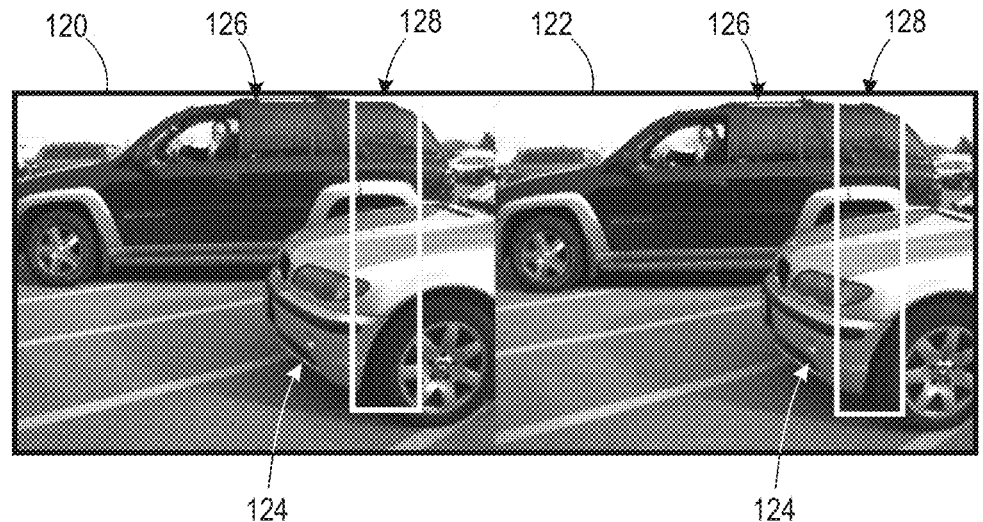
FIG. 2 illustrates a stereo image produced by methods and systems herein.

FIG. 2 illustrates a sample video frame captured with the video camera. The sample video frame shown in FIG. 2 includes two views 120, 122 of the same area of interest obtained at the same time from different angles. The differences between the two views 120, 122 is caused only because they are acquired from slightly different angles, as the two views are of the same area and are obtained substantially at the same time (obtained substantially simultaneously).

The ROI selection module 102 identifies the ROI within the captured images. The merge line is a physical or virtual line in real-world space (such as the merge area 216 shown in FIGS. 6 and 7, discussed below). The merge line or area demarks the location where the number of lanes is reduced. The ROI is the area about the merge line as viewed in the image space and such terms are used interchangeably.

The ROI can be established in a video surveillance setting by manual selection of points or areas at set up. In this example, the ROI is shown as boxes 128 in FIG. 2. Systems herein place the ROI at the vehicle entering points, so that the ROI is large enough to cover both lanes and for signal robustness, but the ROI is also small enough for computational efficiency. The physical or virtual merge line and the corresponding image ROI are located far enough downstream in the traffic flow so that any vehicle detected is the next vehicle to occupy the merge resource, while also being far enough upstream in the traffic flow to uniquely determine the source lane of a vehicle merging. One alternative for locating the ROI uses automatic detection of known markers in real-world space, such as a painted line, reflectors, or a post.

In another alternative, the ROI includes all detected vehicle pixels for a current frame, and thus may change position frame to frame. The advantage of this approach is that it makes use of all detected vehicle pixels for the distance estimation and lane determination modules. However, noises from vehicle detection (e.g., shadow pixels that could be mistaken as part of the moving vehicle via motion detection methods) should be controlled in such alternatives.

As mentioned above, the vehicle detection module 104 determines the presence of a vehicle in the ROI. The vehicle detection module 104, in general, is a feature or activity detector. It determines the presence of a vehicle (or features) for distance estimation. The vehicle detection can be performed in various ways.

In one example, the vehicle detection is performed via motion detection (such as frame-to-frame differences, optical flow, etc.) followed by morphological filtering and size thresholding. This approach has a computational advantage, which can be well suited for real-time implementation. However, such an approach may lose ground when a moving object is viewed that is about the size of vehicle in pixels (can be a small object in front of the camera or a huge object very far away). This is not common and is easily solved in practice by limiting the operation depth range of the stereo camera and an effective use of vision-based object recognition methods.

In another example, a vision-based object recognition method can be applied frame-to-frame. This yields robust vehicle detection but at a much higher computation cost, which adds a challenge in meeting real-time implementation speeds. Yet another example is a mix of motion detection, object recognition, and tracking methods for vehicle detection. In this case, the first occurrence of motion detection will trigger object recognition. If vehicle recognition is confirmed, object tracking is used for the future frames until the object leaves the scene. If vehicle recognition is not confirmed, motion detection will continue for the next frame and the process is repeated.

With respect to the depth estimation module 106, given the a priori knowledge of relative position of the at least two cameras (for stereo vision) and camera calibration parameters, the depth estimation module 106 reduces to a correspondence match and disparity calibration. Thus, the above mentioned camera information is gathered via a standard camera calibration procedure and remains a constant if the cameras are fixed. For a simplified stereo camera that lines up horizontally and has a fixed baseline with identical camera intrinsic parameters, the depth d is computed as $d=ft/(\Delta j)$, where f is the focal length, t is the baseline, and $\Delta j$ is the disparity in pixel units. The disparity is the difference of the pixel column locations of the same viewed feature.

An example of the relationship between disparity and distance is seen in the front wheels of the two vehicles illustrated in the two different frames 120, 122, shown in FIG. 2. The front wheel of the car 124 has a much greater disparity in the stereo pair 120, 122 than does the front wheel of the SUV 126. Thus, the systems and methods herein conclude that SUV 126 is farther away from the sensor than the car 124.

In some examples, the depth estimation module 106 uses dense or sparse depth maps to provide input to the lane determination module 108. When computing a dense depth map, the systems and methods herein estimate depth for all overlapping (corresponding) pixels in the stereo pair 120, 122. In one example this involves the following steps: finding corresponding points in the stereo pair 120, 122, and computing the disparity, thus, the depth, for these points, and then interpolating the depth of pixels for which correspondence cannot be directly found (at least not robustly found). For a simplified stereo camera used in this example (horizontal disparity), the correspondence match occurs on the same row of pixels among the pair, and thus the search is much faster and more robust.

For many stereo camera manufacturers, tools for computing the dense depth map are often provided along with the camera. However, with this specific example, with a limited ROI and primarily horizontal disparity, it can be beneficial to implement a unique dense depth map to reduce the computational burden. Thus, systems and methods herein compute what is referred to herein as a sparse depth map, instead of using the conventional dense depth map.

The sparse depth map computation performed by systems and methods herein finds the depth for a reduced number of key points of interest (less than all data/pixel points). The depth (disparity) computation is similar to the dense depth map derivation but is localized to image features such as, Harris Corners, scale invariant feature transform (SIFT) interest points, speeded up robust features (SURF) interest points, etc. This is much more computationally efficient than deriving a dense depth map, since many of the developments in dense map construction focus on solving the challenges of finding appropriate distance estimation for near texture-less regions (those with non-interesting points).

In sparse depth map computation, all that is needed is a sufficient number of data points within the ROI so that enough distance information about the vehicle can be gathered to uniquely distinguish one moving item from another. As a result, these points can be the interesting points that are typically used for finding sparse correspondences. Since a moving item has edges, it is very reasonable to expect there are enough points within the ROI for this purpose. However, it is sometimes beneficial to use the ROI that includes all detected vehicle pixels rather than a fixed ROI 128 shown in FIG. 2, if the sparse depth map is chosen.

The lane determination module 108 determines the source lane of the vehicle of interest prior to entering the merging lane. The source lane is determined by finding the distance of the side of the vehicle of interest to the sensor (i.e., the distance of a detected vehicle) and matching that to the distance that the different lanes are located relative to the camera.

Figure 3:
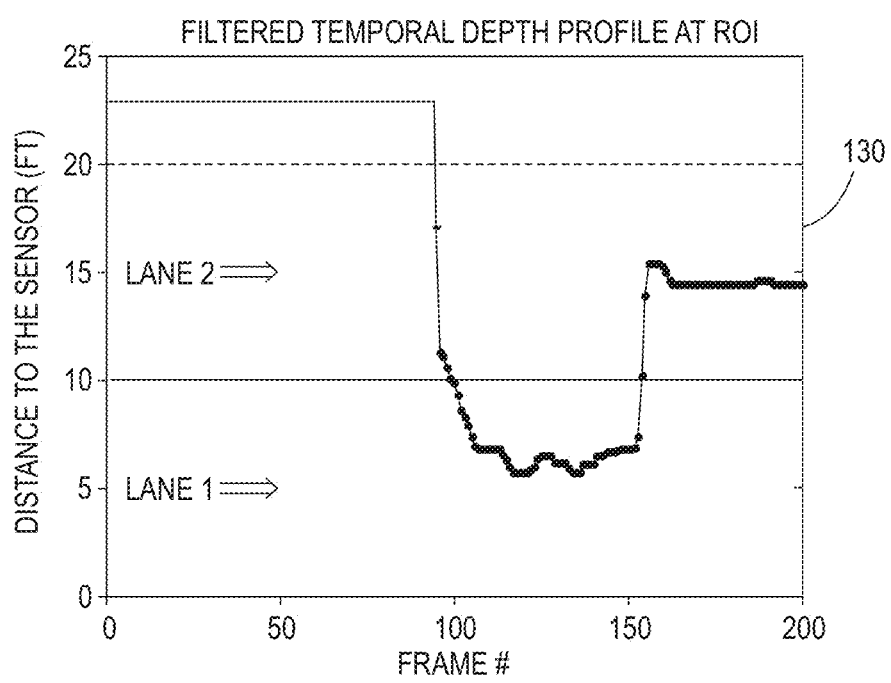
FIG. 3 is a chart showing signature profiles produced by methods and systems herein.

In the case of a fixed ROI 128, the systems and methods herein store a running temporal depth profile and then determine the lane information by observing this depth profile over time and comparing the depth profile to a set of thresholds. The depth profile can be taken from one or more points, and a robust solution generates the profile by applying a median filter to the depths of multiple points of interest of a detected vehicle. An example of a median-filtered depth profile produced by systems and methods herein is shown in FIG. 3. The lane information (Lane 1 vs. Lane 2) is clearly shown as different steps in the profile 130.

When using a dynamic ROI, the depth of all detected vehicle pixels are computed by systems and methods herein. The lane determination module 108 calculates the resulting depth (e.g., median of the vehicle pixel depth in the ROI) of the vehicles. The lead vehicle's distance (originating lane) is then based on the depth of left-most pixel of the vehicle blobs if the vehicles are moving from right to left in the frames. As discussed above, the computation of dynamic ROI is more computationally expensive in terms of distance estimation and other factors since the ROI is changing frame to frame and is typically larger than the fixed ROI approach. Also, dynamic ROI can be susceptible to the noise caused by shadows and other spurious detected motion, if motion detection is used for vehicle detection.

A temporal view of lane information for vehicles approaching the merging lane, as presented above, is usually sufficient for maintaining the correct vehicle order. However, there is the potential for issues to arise due to certain noises or customer behavior (cut ins, pedestrians, drive aways, etc.). For that purpose, the vehicle identification and matching module 110 can collect initial image features such as color, shape, height, width at the merging location, and can compare such image features obtained using a second camera positioned near the order completion area (e.g., order pick-up window).

Figure 4:
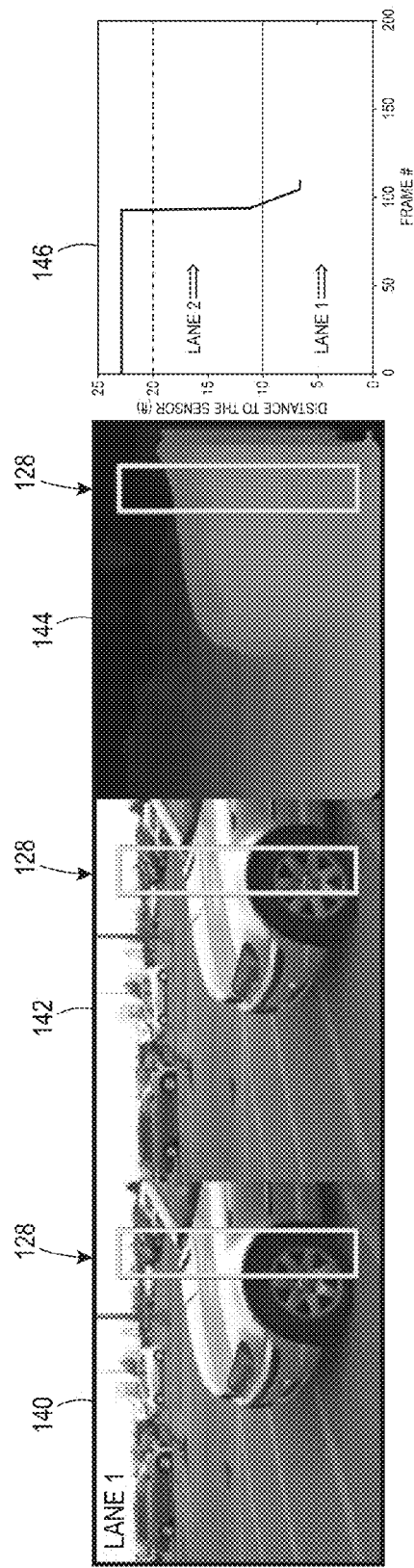
FIG. 4 illustrates images and charts showing signature profiles produced by methods and systems herein.
Figure 5A:
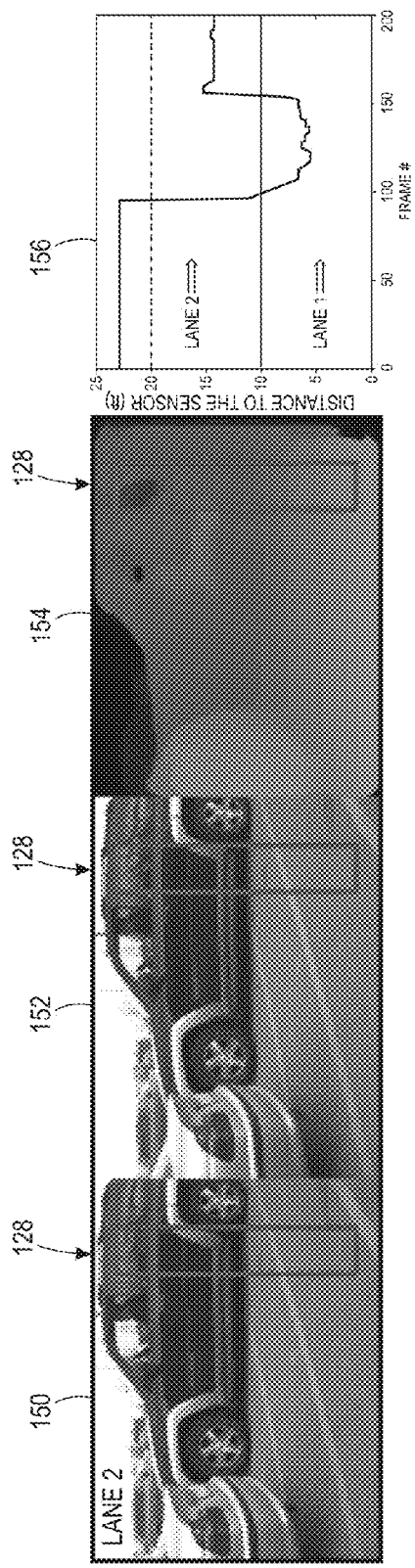
FIGS. 5(A)-5(D) illustrate images and charts showing signature profiles produced by methods and systems herein.
Figure 5B:
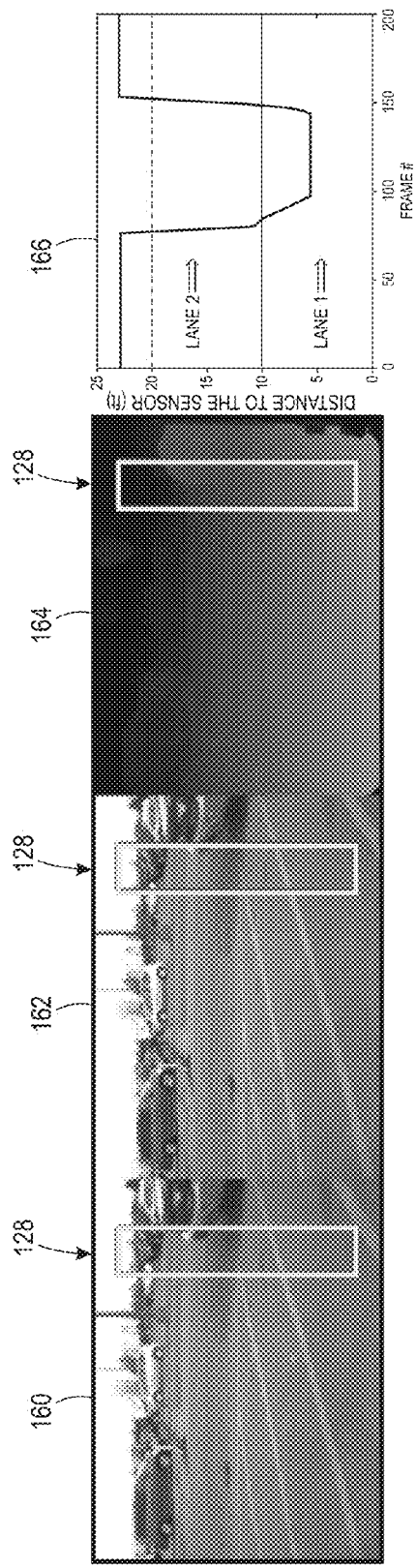
Figure 5C:
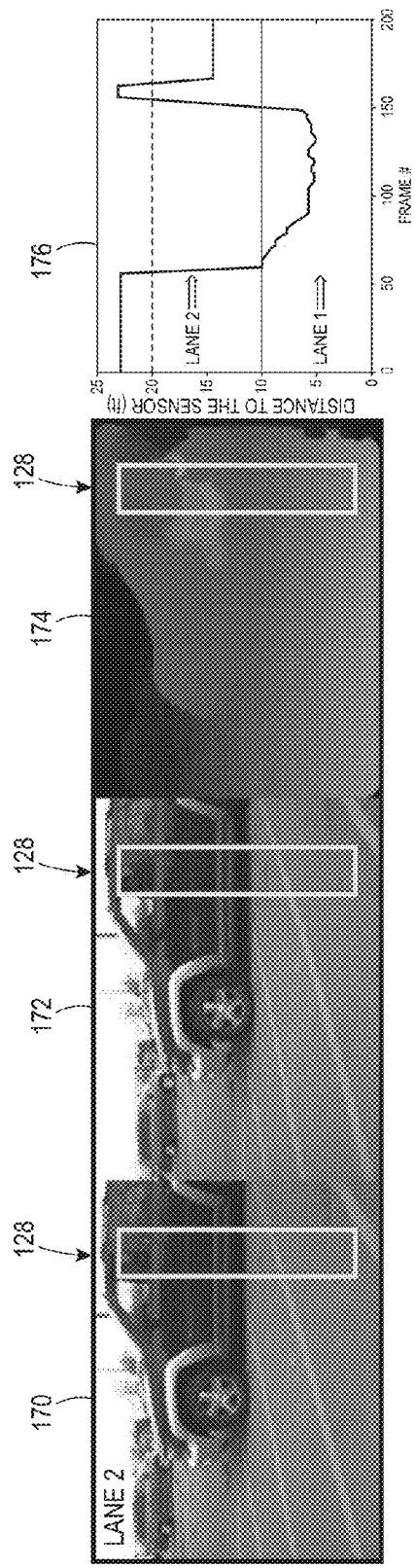
Figure 5D:
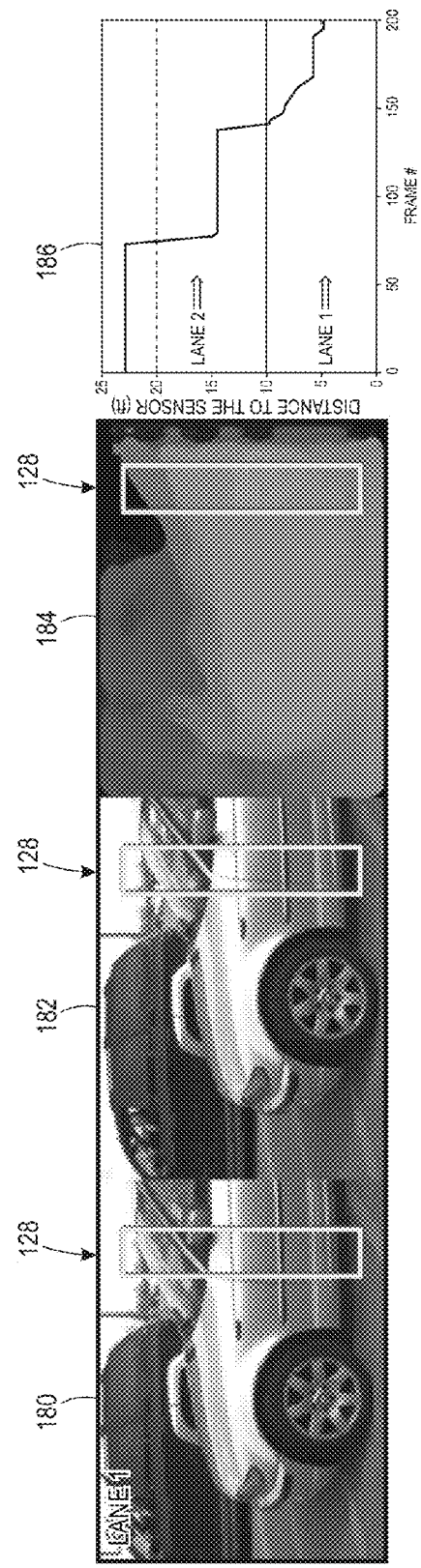

FIGS. 4-5(D) illustrate examples that further highlight the features and operations of systems and methods herein. FIG. 4 shows the result of analyzing video up to the first frame where the vehicle detection module 104 declares a vehicle present. More specifically, in FIG. 4 the left two images 140, 142 are stereo-pairs acquired by a stereo camera. Again, box 128 represents a pre-defined ROI.

The vehicle detection module 104 performs motion detection followed by morphological filtering and size thresholding for the entire frame of the left-most image 140. However, only the detected motion pixels within the box 128 require further processing. In this implementation, a combination of frame-to-frame difference and optical flow for motion detection are used for simplicity and computational advantages.

The third image 144 is the resulting dense depth map produced when the depth estimation module 106 analyzes the stereo-pair. In some examples, the depth estimation module 106 computes the dense depth map for the entire frame and for all frames. In other examples, the depth estimation module 106 only computes the depth map within the ROI and for frames that contain more than N (e.g., N=100) detected motion pixels in ROI. This reduces the computation for the depth estimation module 106 significantly.

If the number of detected motion pixels is less than or equal to N, the vehicle detection module 104 concludes that no detected vehicle of interest is in the view of ROI. In that case, the temporal depth data for current frame is set to a maximum region of interest depth, which is the largest depth field allowed in this example, with this stereo camera.

If there is a detected vehicle of interest in the view of ROI, the median of the resulting depths of the detected motion pixels in ROI is stored as the temporal depth data by the depth estimation module 106. This running temporal depth data represents the distance of the vehicle of interest to the camera over a time period of interest, and is shown graphically in item 146 as what is referred to herein a "temporal depth data" maps, profiles, or graphs. This running temporal depth data can be further filtered with, for example, a 15-tap median filter, which translates to 2-sec delay for 7.5 fps video.

The right-most item 146 in FIG. 4 is the resulting temporal depth data up to a current frame, representing the distance of the potential vehicle approaching the merging zone. For prompt response, the lane determination module 108 can determine the lane information based on the depth data of the current frame. Alternatively, the depth estimation module 106 can use the most recent M data points (e.g., M=10) to yield a more robust decision. The robustness can be further improved by incorporating vehicle speed and the expected length of typical vehicle can be chosen M dynamically.

In one example of lane determination, if all M depth data are between 10 and 20 ft, then vehicle is in the far lane (Lane 2). If the data are all between 0 and 10 ft, then vehicle is in the near lane (Lane 1). Otherwise, no vehicle is present, and this can be labeled as 0. Note that a switch of lane information (0, 1, or 2) indicates the start or end of a vehicle. One issue that occurs with this approach is when two consecutive vehicles are at the same lane with very small gap between them; however, this issue is addressed by using a higher video acquisition rate. For example, using a 30 fps video, the lane determination module 108 can resolve a 1 ft gap for a vehicle travel at 20 mph.

FIGS. 5(C)-5(D) illustrate the final results (i.e. up to the last stereo-pair frames) of four test video series of stereo frames analyzed according to the processing shown in FIG. 4. The last stereo pairs are represented as items 150, 152, 160, 162; 170, 172; and 180, 182 in FIGS. 5(A)-5(D). The dense depth map produced is represented as items 154, 164, 174, 184 in FIGS. 5(A)-5(D); and the charted temporal depth data is shown as items 156, 166, 176, 186 in FIGS. 5(A)-5(D).

The "result" of the order in which the vehicles entered the merge lane can be seen by observing the steps in the temporal depth data map 156 in, for example FIG. 5(A) where Lane 1 enters first (lower step followed by higher step in the temporal depth data map 156). To the contrary, in the temporal depth data map 186 in, for example FIG. 5(D), Lane 2 enters first (higher step followed by lower step in the temporal depth data map 186). In FIGS. 4 and 5(A)-5(D), when a non-zero lane state is detected for a current frame, the identified lane information can be displayed, such as on the upper left corner of the left-most image (and can be color code with red for Lane 1 and blue for Lane 2). The results from this method match the true orders in which the vehicles entered the merge lane for all four test video sequences analyzed.

Note that all series of images discussed above show that the distance information is only used for lane determination in the ROI for vehicles that are in motion.

Figure 6:
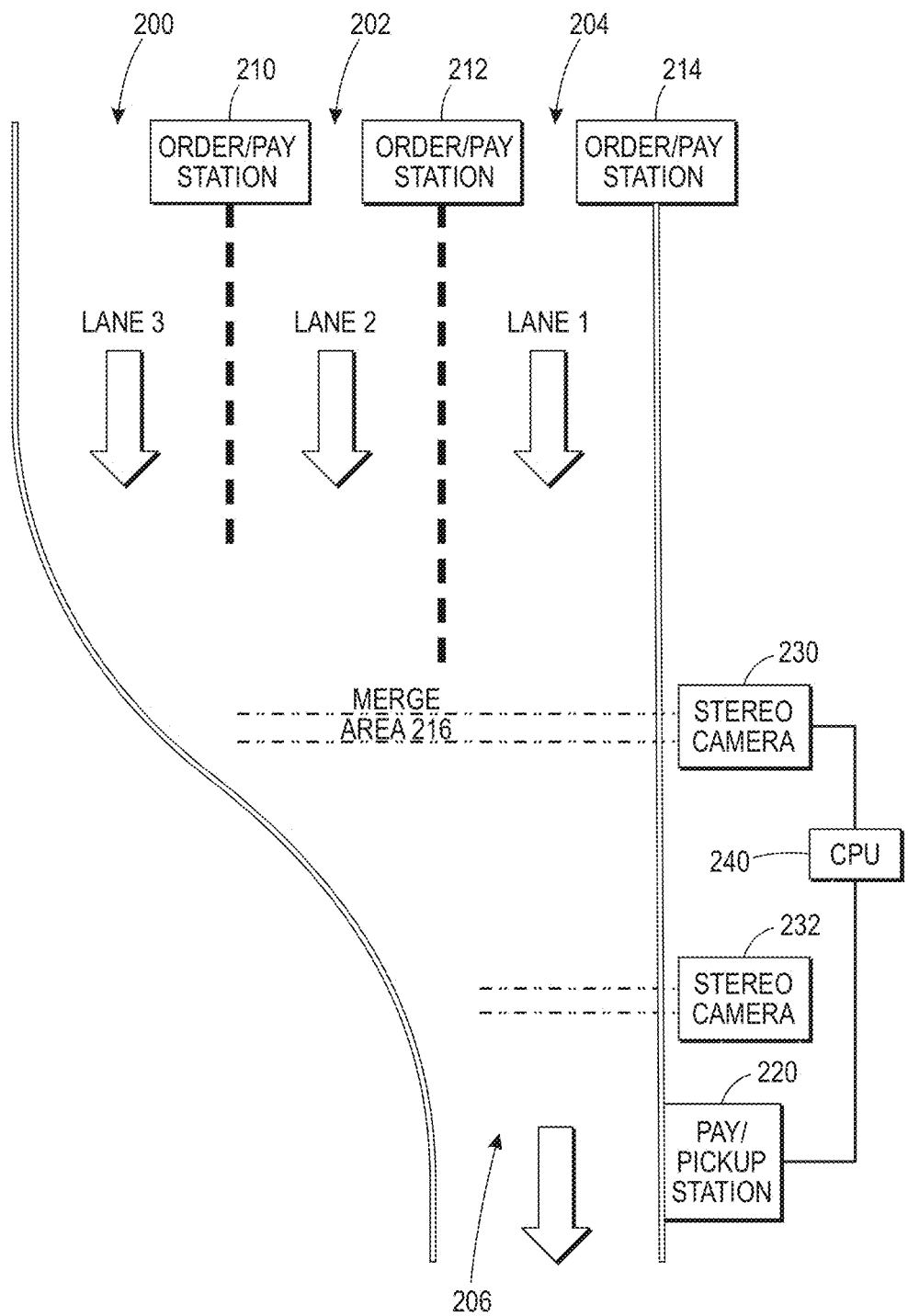
FIG. 6 is a schematic diagram illustrating devices herein.

FIG. 6 is a top-down view of merging lanes 200, 202, 204 that may be part of, for example, a drive-through ordering system, or other system where moving items (persons, inventory, bulk materials, etc.). Items 210, 212, and 214 represent devices where processing is initiated and can comprise, for example, an order placement station where orders are placed and potentially paid for. Item 230 represents a stereo camera 230 aimed at a merge area 216 (the ROI, in this example). The multiple cameras of a camera network (or imaging devices of a stereo camera) have a field of views that are fixed and overlap the first location 216. The dual dotted lines represent separate camera views of the stereo cameras herein. Item 240 is a computerized device, such as central processing unit (CPU), or other type of processor. Item 240 can include many of the items shown in FIG. 1, discussed above.

Item 232 represents another stereo camera that can be used to confirm the order of moving items in the merge lane 206. More specifically, stereo camera 232 is positioned to record images of moving items in the merge lane 206 before such items reach the station (item 220) where the next step in processing performed or transactions are partially or fully completed. Thus, item 220 can comprise a station where orders that are placed at stations 210, 212, or 214 are picked up and potentially paid for.

Figure 7:
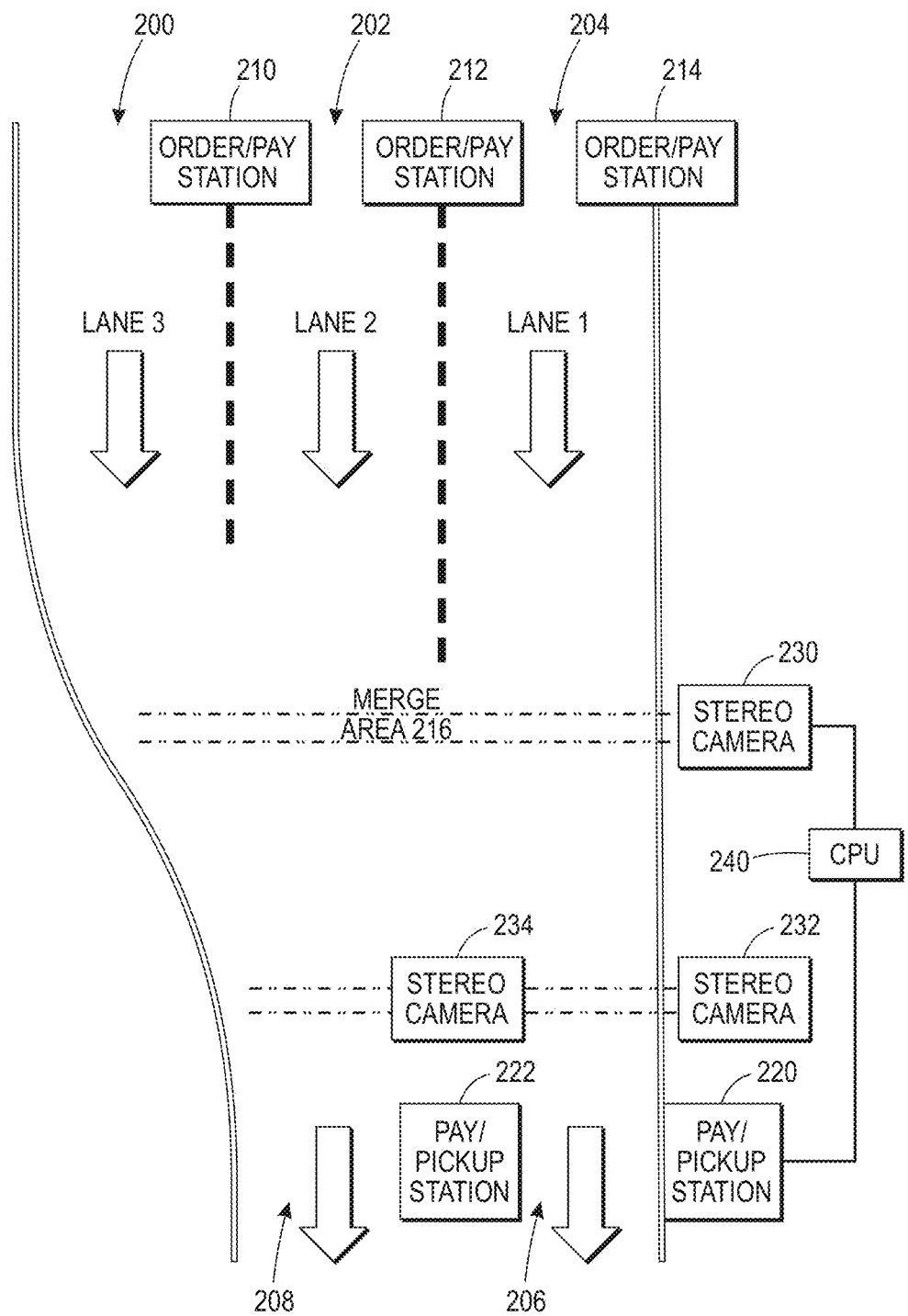
FIG. 7 is a schematic diagram illustrating devices herein.

FIG. 7 is similar to FIG. 6, but includes a second transaction completion station 222 using a second merge lane 208. Here, an optional confirmation stereo camera 234 can also be used to confirm moving items that merge into lane 208.

Thus, exemplary systems herein include a camera, such as an optical stereo camera 230 (a camera 230 having multiple imaging units or cameras) aimed at a first location 216. The first location 216 comprises, for example, a horizontal surface having multiple parallel primary lanes 200, 202, 204 merging into a reduced number of secondary lanes, such as a single secondary lane 206. In this example, the stereo camera 230 has cameras that are positioned relative to each other in a horizontal plane, approximately parallel to the horizontal surface of the lanes 200, 202, 204. Moving items (e.g., any type of items, such as vehicles, goods, persons, persons within vehicles, etc.) within the primary lanes 200, 202, 204 initiate transactions, and complete the transactions while in the secondary lane 206.

A processor 240 is operatively connected to the stereo camera 230. The processor 240 calculates the distances the moving items are from the stereo camera 230 in the horizontal direction based on differences between images of the moving items obtained by the multiple cameras of the stereo camera 230. More specifically, the processor 240 determines the sequence in which the moving items entered the secondary lane 206 by detecting a relative position and relative distance of the moving items as the moving items pass the first location 216, as discussed above. The processor 240 calculates the distances of the moving items from the stereo camera 230 by creating temporal depth maps or profiles for each of the moving items that pass the first location 216 when at least a portion of the moving items are within the first location.

This identifies in which of the primary lanes 200, 202, 204 each of the moving item was located before merging into the secondary lane 206 and allows the processor 240 to order the transactions in a "merge order." The merge order corresponds to the sequence in which the moving items entered the secondary lane 206 from the primary lanes 200, 202, 204. An interface in item 240 is operatively connected to the processor 240, and the interface outputs the transactions (in the merge order) to a transaction device 220 that completes the transactions.

Additionally, the processor 240 can develop "initial" signature profiles of the moving items as the moving items pass the first location 216. Such initial signature profiles can include items such as color, shape, height, width, etc., of the moving items. The apparatus can further comprise a second stereo camera 230 at a second location of the secondary lane 206 (adjacent where the moving items complete the transaction). The processor 240 can thus similarly develop "confirmation" signature profiles of the moving items (that, again, can include color, shape, height, width, etc., of the moving items) as the moving items pass the second location 206. In addition, the initial signature profiles can be based on patterns of the temporal depth data charts discussed above, and the confirmation profiles can match such patterns of the temporal depth data charts (even if they are of different intensity levels because of potentially being closer to the confirmation stereo camera 232).

These initial and confirmation signature profiles allow the processor 240 to confirm or change the merger order. Specifically, the processor 240 confirms the merge order before the interface outputs the transactions to the transaction device 220 based on the confirmation signature profile matching the initial signature profile. To the contrary, the processor 240 changes the merge order before the interface outputs the transactions to the transaction device if the confirmation signature profile does not match the initial signature profile (changes the order to an order indicated by the sequence of confirmation signature profiles).

To satisfy space constraints, in some situations, the stereo camera 230 can be positioned next to the moving items and the processor 240 calculates the distances based only on side images of the moving items (as shown in FIG. 2, for example). Further, to simplify the device and reduce costs, the stereo camera 230 can be a stationary, non-moving stereo camera 230 that is in a fixed position.

Figure 8:
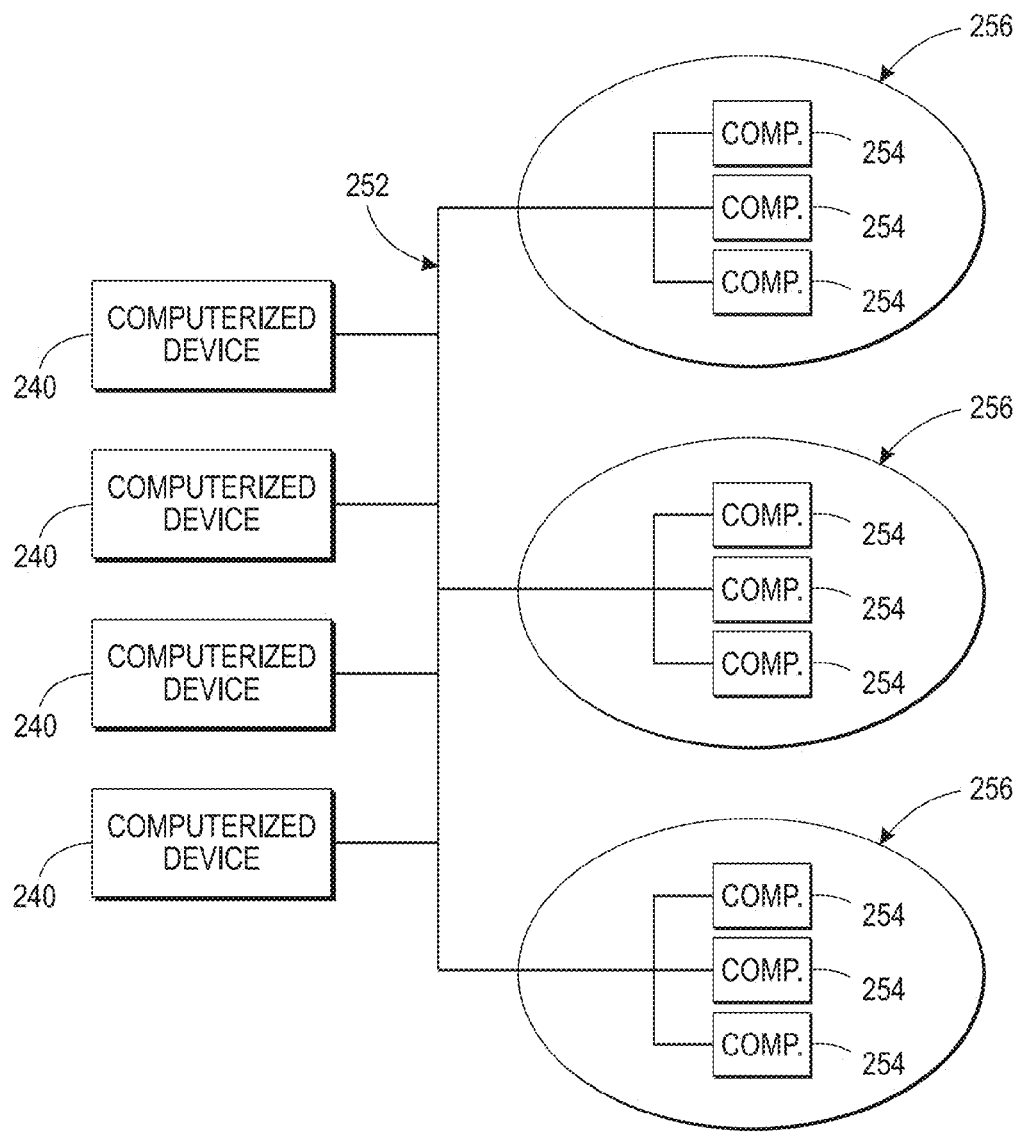
FIG. 8 is a schematic diagram illustrating systems herein.

As shown in FIG. 8, exemplary system systems and methods herein include various computerized devices 240, 254 located at various different physical locations 256. The computerized devices 240, 254 can include print servers, printing devices, personal computers, etc., and are in communication (operatively connected to one another) by way of a local or wide area (wired or wireless) network 252. Therefore, the processing does not need to be done locally at the location of the stereo camera, but can be performed using a centralized processing system connected to the stereo camera(s) through the network 252.

Figure 9:
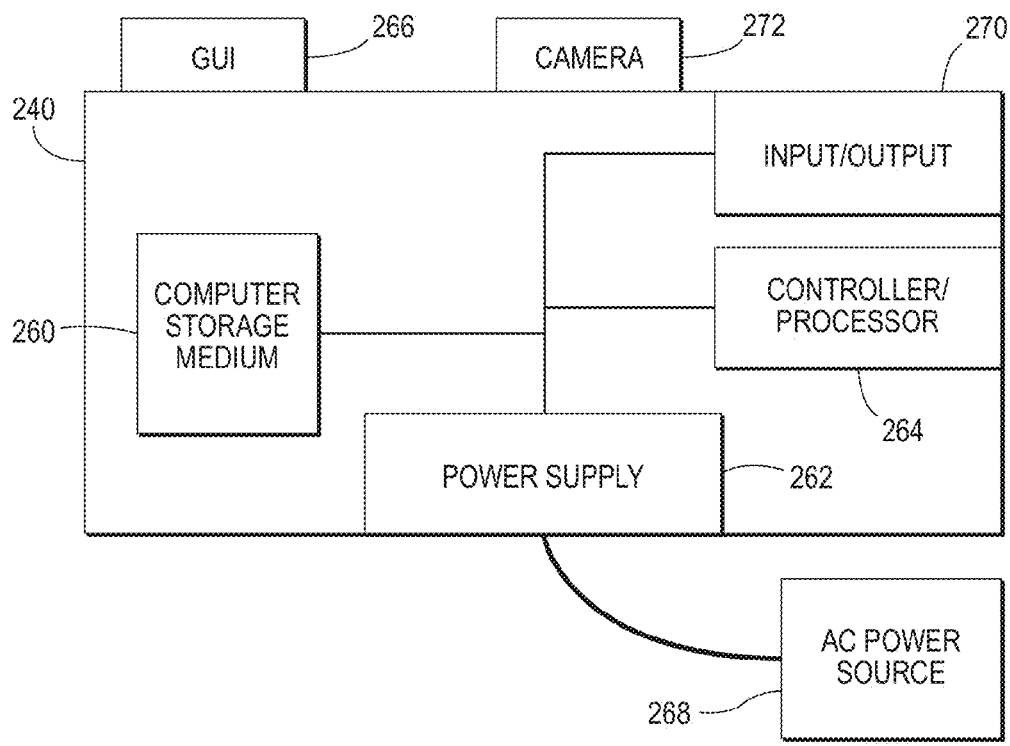
FIG. 9 is a schematic diagram illustrating devices herein.

FIG. 9 illustrates one exemplary configuration of the computerized device 240, which can be used with systems and methods herein and can comprise, for example, a server, a personal computer, a portable computing device, etc. The computerized device 240 includes a controller/processor 264 and a communications port (input/output) 270 operatively connected to the processor 264 and to the computerized network 252 external to the computerized device 240. Also, the computerized device 240 can include at least one accessory functional component, such as a graphic user interface assembly 266, camera 272, etc., that operate on the power supplied from the external power source 268 (through the power supply 262).

The input/output device 270 is used for communications to and from the computerized device 240. The processor 264 controls the various actions of the computerized device. A non-transitory computer storage medium device 260 (which can be optical, magnetic, capacitor based, etc.) is readable by the processor 264 and stores instructions that the processor 264 executes to allow the computerized device to perform its various functions, such as those described herein. The power supply 222 can comprise a power storage element (e.g., a battery, etc).

Figure 10:
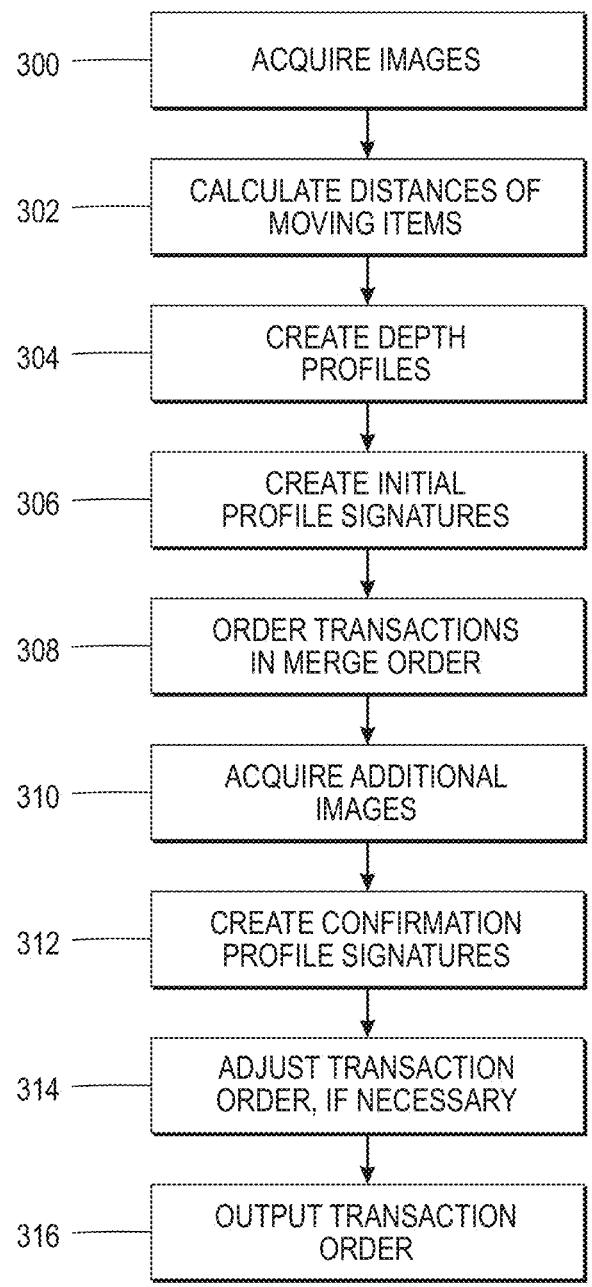
FIG. 10 is a flow diagram of various methods herein.

FIG. 10 is flowchart illustrating exemplary methods herein. In item 300, these methods acquire images using an optical stereo camera or camera network aimed at a first location (e.g., using the first stereo camera 230 aimed at the merge area 216). The devices herein can use a single stereo camera having multiple imaging units, or a camera network having multiple cameras. The multiple cameras of a camera network (or imaging devices of a stereo camera) have a field of views that are fixed and overlap the first location 216. Again, the first location comprises multiple parallel primary lanes merging into a reduced number of at least one secondary lane, and moving items within the primary lanes initiate transactions and complete the transactions while in the secondary lane.

In item 302, such methods calculate distances of the moving items from the camera (or distances from a reference camera, if a camera network is used) using a processor operatively connected to the camera to identify in which of the primary lanes each of the moving item was located before merging into the secondary lane. The methods herein thus calculate the distances of the moving items from the camera to create temporal depth profiles (shown in item 304) for each of the moving items that pass the first location, using the processor.

Further, in some instances, these methods can develop initial signature profiles of the moving items in item 306. These initial signature profiles comprise the color, shape, height, width, etc., of the moving items as the moving items pass the first location (using the images acquired in item 300).

In item 308, these methods then order the transactions in a merge order corresponding to a sequence in which the moving items entered the secondary lane from the primary lanes, using the processor. More specifically, such methods determine the sequence in which the moving items entered the secondary lane by detecting a relative position and relative distance of the moving items as the moving items pass the first location (using the images acquired in item 300).

Also, these methods can similarly acquire additional images using a second camera aimed at a second location of the secondary lane (adjacent where the moving items complete the transaction) as shown by item 310. Thus, the second camera 232 aimed at the order completion lane 206 can be used to acquire such additional images. These additional images are then used to create confirmation signature profiles of the moving items in item 312. These confirmation signature profiles similarly comprise the color, shape, height, width, etc., of the moving items as the moving items pass the second location of the secondary lane (adjacent where the moving items complete the transaction).

Thus, in item 314, these methods confirm the merge order (before the interface outputs the transactions to the transaction device) if the confirmation signature profile matches the initial signature profile, or these methods change the merge order (before the interface outputs the transactions to the transaction device) if the confirmation signature profile does not match the initial signature profile. More specifically, item 314 changes the transaction order to an order matching the sequence of confirmation signature profiles. Then, in item 316, the methods herein output the transactions in the merge order to a transaction device that completes the transactions, using an interface operatively connected to the processor.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

A "pixel" refers to the smallest segment into which an image can be divided. Received pixels of an input image are associated with a color value defined in terms of a color space, such as color, intensity, lightness, brightness, or some mathematical transformation thereof.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
a camera network comprising at least two imaging devices aimed at a first location, said imaging devices having field of views that are fixed, overlap said first location, and are positioned to obtain images of said first location from different angles to provide a stereo view of said first location, said first location comprising multiple parallel primary lanes merging into a reduced number of at least one secondary lane, and moving items within said primary lanes initiating transactions while in said primary lanes and completing said transactions while in said secondary lane;
a processor operatively connected to said camera network, said processor calculating distances of said moving items from said camera network based on differences between said images of each of said moving items obtained from said different angles to identify in which of said primary lanes each of said moving items was located before merging into said secondary lane, and said processor changes a transaction order by ordering said transactions in a merge order corresponding to a sequence in which said moving items entered said secondary lane from said primary lanes; and
an interface operatively connected to said processor, said interface outputting said transactions in said merge order.

2. The apparatus according to claim 1, said processor determining said sequence in which said moving items entered said secondary lane by detecting a relative position and relative distance of said moving items as said moving items pass said first location.

3. The apparatus according to claim 1, said processor calculating said distances of said moving items from a reference device of said imaging devices in said camera network by creating temporal depth profiles for each of said moving items that pass said first location.

4. The apparatus according to claim 1, said processor developing initial signature profile of said moving items comprising at least one of color, shape, height, and width of said moving items as said moving items pass said first location,
said apparatus further comprising a second camera at a second location of said secondary lane adjacent where said moving items complete said transactions,
said processor developing confirmation signature profile of said moving items comprising said at least one of color, shape, height, and width of said moving items as said moving items pass said second location,
said processor confirming said merge order before said interface outputs said transactions based on said confirmation signature profile matching said initial signature profile, and
said processor changing said merge order before said interface outputs said transactions based on said confirmation signature profile not matching said initial signature profile.

5. The apparatus according to claim 1, said processor calculating said distances when at least a portion of said moving items are within said first location.

6. The apparatus according to claim 1, said processor detecting a presence of said items within said first location based on at least one of motion detection and vision-based object recognition.

7. An apparatus comprising:
an optical stereo camera comprising multiple cameras aimed at a first location, said multiple cameras having field of views that are fixed, overlap said first location and are positioned to obtain images of said first location from different angles to provide a stereo view of said first location, said first location comprising multiple parallel primary lanes merging into a reduced number of at least one secondary lane, and moving items within said primary lanes initiating transactions while in said primary lanes and completing said transactions while in said secondary lane;
a processor operatively connected to said stereo camera, said processor calculating distances of said moving items from said stereo camera based on differences between images of each of said moving items obtained by said multiple cameras from said different angles to identify in which of said primary lanes each of said moving items was located before merging into said secondary lane, and said processor changes a transaction order by ordering said transactions in a merge order corresponding to a sequence in which said moving items entered said secondary lane from said primary lanes; and an interface operatively connected to said processor, said interface outputting said transactions in said merge order.

8. The apparatus according to claim 7, said processor determining said sequence in which said moving items entered said secondary lane by detecting a relative position and relative distance of said moving items as said moving items pass said first location.

9. The apparatus according to claim 7, said processor calculating said distances of said moving items from said stereo camera by creating temporal depth profiles for each of said moving items that pass said first location.

10. The apparatus according to claim 7, said processor developing initial signature profile of said moving items comprising at least one of color, shape, height, and width of said moving items as said moving items pass said first location, said apparatus further comprising a second stereo camera at a second location of said secondary lane adjacent where said moving items complete said transactions, said processor developing confirmation signature profile of said moving items comprising said at least one of color, shape, height, and width of said moving items as said moving items pass said second location, said processor confirming said merge order before said interface outputs said transactions based on said confirmation signature profile matching said initial signature profile, and said processor changing said merge order before said interface outputs said transactions based on said confirmation signature profile not matching said initial signature profile.

11. The apparatus according to claim 7, said processor calculating said distances when at least a portion of said moving items are within said first location.

12. The apparatus according to claim 7, said processor detecting a presence of said items within said first location based on at least one of motion detection and vision-based object recognition.

13. An apparatus comprising:

an optical stereo camera comprising multiple cameras aimed at a first location, said multiple cameras having field of views that are fixed, overlap said first location and are positioned to obtain images of said first location from different angles to provide a stereo view of said first location, said first location comprising a horizontal surface having multiple parallel primary lanes merging into a reduced number of at least one secondary lane, said stereo camera being aimed in a horizontal direction parallel to said horizontal surface, and moving items within said primary lanes initiating transactions while in said primary lanes and completing said transactions while in said secondary lane;

a processor operatively connected to said stereo camera, said processor calculating distances of said moving items from said stereo camera in said horizontal direction based on differences between images of each of said moving items obtained by said multiple cameras from said different angles to identify in which of said primary lanes each of said moving items was located before merging into said secondary lane, and said processor changes a transaction order by ordering said transactions in a merge order corresponding to a sequence in which said moving items entered said secondary lane from said primary lanes; and an interface operatively connected to said processor, said interface outputting said transactions in said merge order.

14. The apparatus according to claim 13, said processor determining said sequence in which said moving items entered said secondary lane by detecting a relative position and relative distance of said moving items as said moving items pass said first location.

15. The apparatus according to claim 13, said processor calculating said distances of said moving items from said stereo camera by creating temporal depth profiles for each of said moving items that pass said first location.

16. The apparatus according to claim 13, said processor developing initial signature profile of said moving items comprising at least one of color, shape, height, and width of said moving items as said moving items pass said first location, said apparatus further comprising a second stereo camera at a second location of said secondary lane adjacent where said moving items complete said transactions, said processor developing confirmation signature profile of said moving items comprising said at least one of color, shape, height, and width of said moving items as said moving items pass said second location, said processor confirming said merge order before said interface outputs said transactions based on said confirmation signature profile matching said initial signature profile, and said processor changing said merge order before said interface outputs said transactions based on said confirmation signature profile not matching said initial signature profile.

17. The apparatus according to claim 13, said processor calculating said distances when at least a portion of said moving items are within said first location.

18. The apparatus according to claim 13, said processor detecting a presence of said items within said first location based on at least one of motion detection and vision-based object recognition.

19. A method comprising:

acquiring images using an camera network comprising at least two imaging devices aimed at a first location, said imaging devices having field of views that are fixed, overlap said first location and are positioned to obtain images of said first location from different angles to provide a stereo view of said first location, said first location comprising multiple parallel primary lanes merging into a reduced number of at least one secondary lane, and moving items within said primary lanes initiating transactions while in said primary lanes and completing said transactions while in said secondary lane;

calculating distances of said moving items based on differences between said images of each of said moving items obtained from said different angles using a processor operatively connected to said camera network to identify in which of said primary lanes each of said moving items was located before merging into said secondary lane;

ordering said transactions in a merge order corresponding to a sequence in which said moving items entered said secondary lane from said primary lanes to change a transaction order, using said processor; and outputting said transactions in said merge order using an interface operatively connected to said processor.

20. The method according to claim 19, further comprising determining said sequence in which said moving items entered said secondary lane by detecting a relative position and relative distance of said moving items as said moving items pass said first location, using said processor.

21. The method according to claim 19, further comprising calculating said distances of said moving items from said camera network by creating temporal depth profiles for each of said moving items that pass said first location, using said processor.

22. The method according to claim 19, further comprising:
   developing initial signature profile of said moving items comprising at least one of color, shape, height, and width of said moving items as said moving items pass said first location at said first location, using said processor;
   developing confirmation signature profile of said moving items comprising said at least one of color, shape, height, and width of said moving items as said moving items pass a second location of said secondary lane adjacent where said moving items complete said transactions, using said processor;
   confirming said merge order before said interface outputs said transactions based on said confirmation signature profile matching said initial signature profile, using said processor; and
   changing said merge order before said interface outputs said transactions based on said confirmation signature profile not matching said initial signature profile, using said processor.

23. The method according to claim 19, said processor calculating said distances when at least a portion of said moving items are within said first location.

24. The method according to claim 19, further comprising detecting a presence of said items within said first location based on at least one of motion detection and vision-based object recognition.

* * * * *